Oct. 30, 1934.  W. F. SMITH ET AL  1,978,965
TANDEM OFFSET DISK HARROW
Filed April 22, 1929  4 Sheets-Sheet 2

Inventors
WILLIAM F. SMITH
AND
UNA H. NEECE.
John P. Smith Atty.

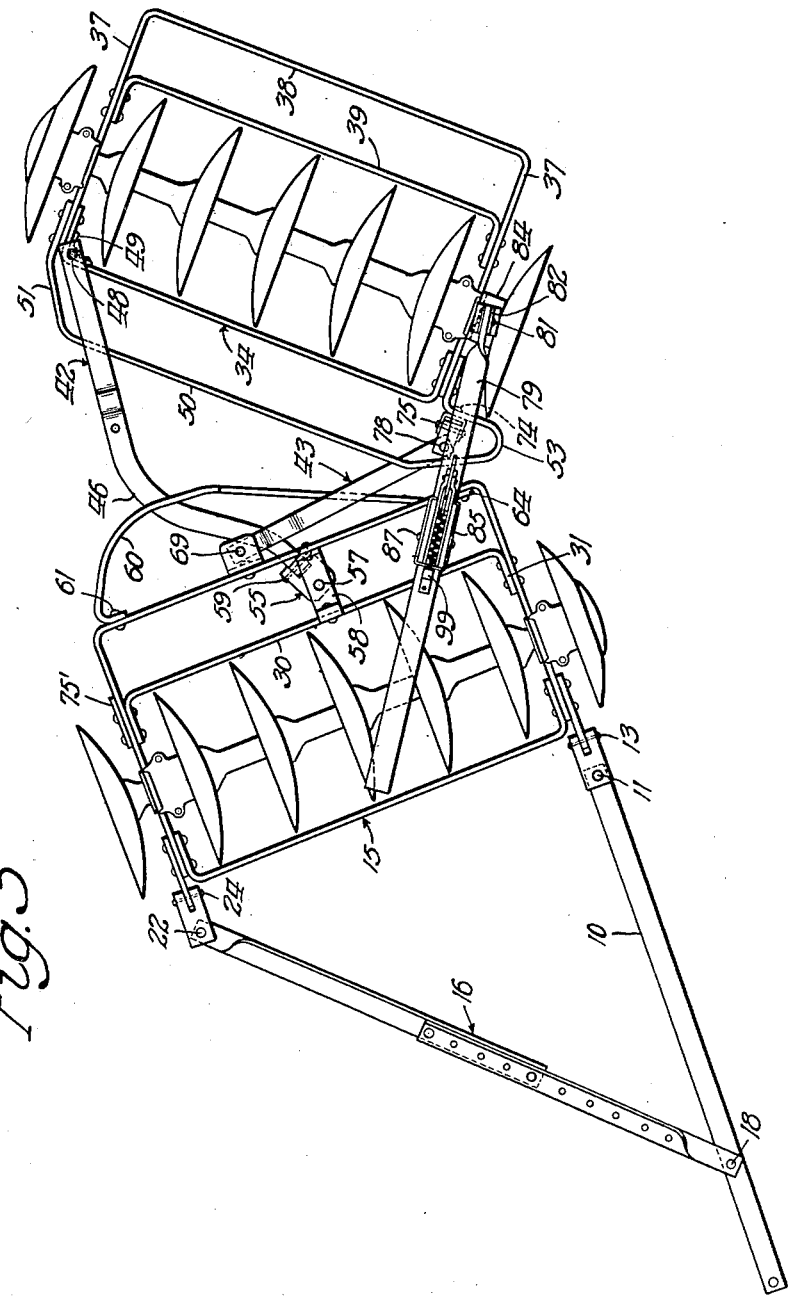

Oct. 30, 1934.  W. F. SMITH ET AL  1,978,965
TANDEM OFFSET DISK HARROW
Filed April 22, 1929   4 Sheets-Sheet 4
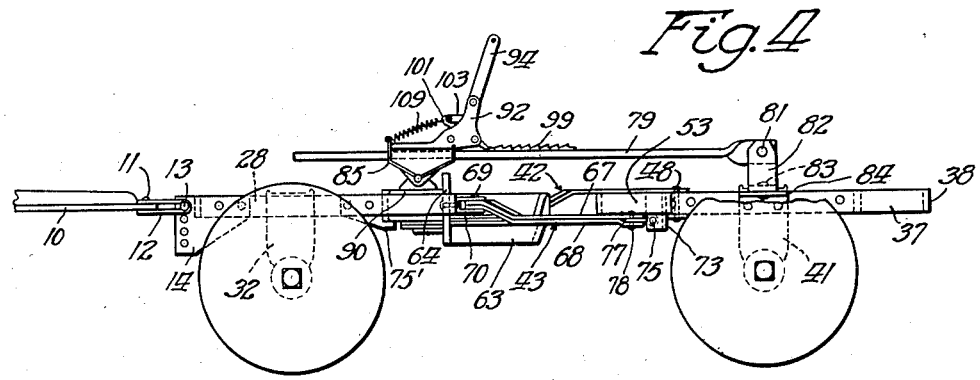
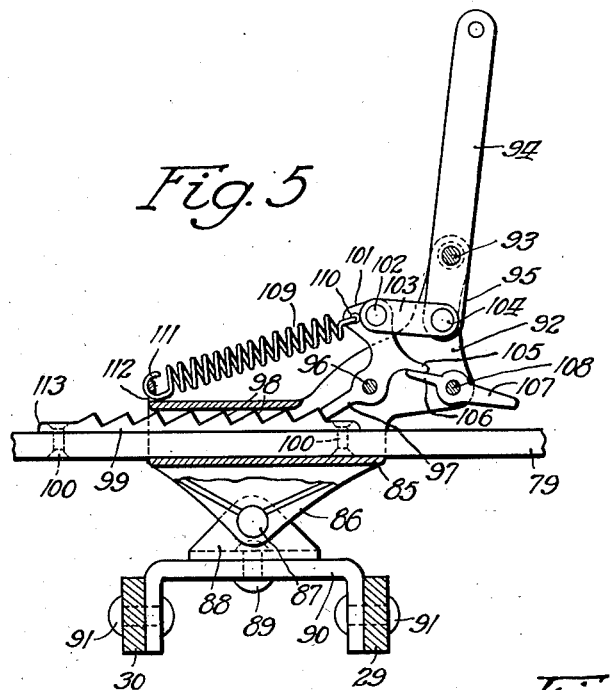
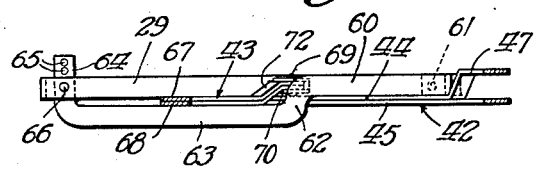
Inventors
WILLIAM F. SMITH
AND
UNA H. NEECE.
John P. Smith Atty.

Patented Oct. 30, 1934

1,978,965

UNITED STATES PATENT OFFICE 1,978,965

TANDEM OFFSET DISK HARROW

William F. Smith, Alameda, and Una H. Neece, Fresno, Calif., assignors to Oliver Farm Equipment Company, a corporation of Delaware Application April 22, 1929, Serial No. 356,958

6 Claims. (Cl. 55—83)

This invention relates to a tandem offset disk harrow adaptable to orchard cultivation and so designed that the harrow will travel to one side of the path of the tractor.

One of the objects of the present invention is to provide a novel and improved form of tandem offset disk harrow in which the gangs thereof may be angled with respect to each other into a working angle by the draft of the tractor.

A further object of the invention is to provide a novel and improved tandem offset disk harrow in which the rear gang may be swung or angled to the left or to the right of the front gang to a working angle or to a trailing angle respectively. In permitting the rear gang to swing to the right of the front gang the tractor and harrow may turn to make a right hand turn without any undue draft on the tractor or strain on the disks of the front and rear gangs.

A further object of the invention is to provide a novel and improved construction of a tandem offset disk harrow in which the connecting links between the front and rear gangs thereof control the depth penetration of the disks on certain ends of the respective disk gangs.

A still further object of the invention is to provide a novel and improved form of tandem offset disk harrow in which the depth penetration of the disks of the respective ends of the front and rear gangs may be adjusted with respect to each other.

A still further object of the invention is to provide a novel and improved form of tandem offset disk harrow in which the forward pivots of the links forming the connection between the front and rear gangs are located at different distances with respect to the longitudinal center of the front gang so that the rear gang will immediately assume a working angle with respect to the front gang on a rearward movement of the tractor, or the rear gang will immediately assume a trailing angle to the right of the front gang on a right hand turn of the tractor.

A still further object of the invention is to provide a novel and improved form of tandem offset disk harrow having a locking connection between the front and rear gangs whereby the gangs may be locked in various angular relations with respect to each other or held in parallel alignment during the backing of the disk harrow.

A still further object of the invention is to provide a novel and improved form of tandem offset disk harrow in which the connecting links forming the connection between the front and rear gangs thereof are so equalized, balanced and connected between the front and rear gangs, that the gangs may be transported in parallel relation.

These and other objects are accomplished by providing a construction and arrangement of the various parts in the manner hereinafter described and particularly pointed out in the appended claims.

Referring to the drawings, Fig. 1 is a top plan view of this improved form of tandem offset disk harrow showing the front and rear disk gangs in parallel position for transportation or backing the harrow into normally inaccessible places.

Fig. 2 is a top plan view of this improved form of tandem offset disk harrow showing the rear disk gang swung or angled to the right with respect to the front disk gang. In this position this harrow trails very efficiently on a right hand turn of the tractor which prevents the right hand end of the front gang from digging into the ground, and the rear gang from being dragged laterally, which occurs in a tandem disk harrow when the rear gang is incapable of being swung to the right of its normal parallel position.

Fig. 3 is a top plan view of this improved form of tandem offset disk harrow showing the gangs thereof angled to a working angle.

Fig. 4 is a side elevational view of this tandem offset disk harrow shown in Fig. 1.

Fig. 5 is an enlarged detailed side elevational view of the locking mechanism for locking the gangs in various angular relations, and Fig. 6 is a side elevational view, partly in cross section showing the link construction between the two gangs and the adjustable guide for varying the depth penetration of the disks on the opposite ends of both gangs.

Figure 1:
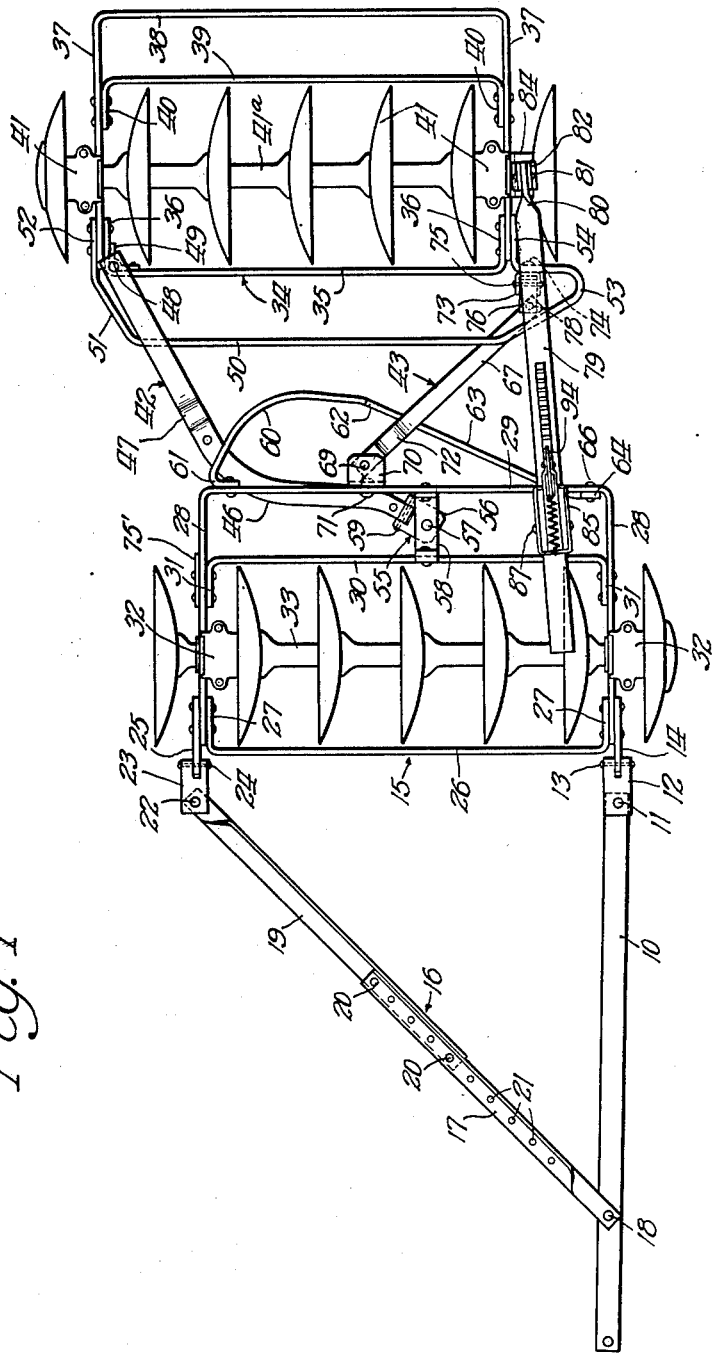

The present invention is directed to a simple and efficiently operating tandem offset disk harrow, which is adapted for orchard cultivation, and is principally designed so that the harrow will travel to one side of the path of the tractor, but at the same time is capable of being properly trailed behind the tractor, when the tractor makes a turn, either to the right or left with the least possible amount of draft or strain on the disks of either gang. The present construction also permits the harrow to be backed with the gangs held in parallel relation into otherwise inaccessible positions in the field, such as in a corner or under a tree, and immediately putting the gangs into a working angle by releasing the latch, and with a slightly further backward travel of the tractor to angle the gangs and thereby permit the gangs of the harrow to immediately assume a cutting effect for complete cultivation of the field.

Heretofore, tandem offset disk harrows have been so constructed that the rear gang thereof has been incapable of properly trailing the tractor when the same was turned to the right, or, in other words, the trailing rear gang could not swing to the right of the forward gang beyond a parallel position with respect to the front gang, and as a result thereof the disks on the right hand end of the front gang dig into the ground, and the disks of the rear gang are literally dragged around the turn. It is therefore, one of the primary objects of the present invention to overcome this unusual strain on the harrow and relieve the excessive draft on the tractor by permitting the rear gangs of the disk harrow to trail the front gang on a right hand turn of the tractor and harrow.

In illustrating one form of this improved tandem offset disk harrow, we have shown the same as comprising a normally horizontally pivoted draft member 10, pivoted for horizontal movement as shown at 11 on a hinge bracket 12, which in turn is pivoted for vertical movement as shown at 13 to a bracket 14, which is secured to one of the side frame members of the front gang frame indicated generally by the reference character 15. The main draft member 10 is adjustable horizontally with respect to the front gang frame 15 for varying the offset of the tandem disk harrow with respect to the path of travel of the tractor by a supplemental adjustable draft member generally indicated by the reference character 16. This draft member 16 comprises a forward member 17 connected at its forward end by means of a bolt 18 to the forward portion of the main draft member 10, and a rearward draft member 19 which is adjustably connected to the other supplemental draft member 17 by means of bolts 20 which may be inserted or connected in various apertures 21 in the member 17 for varying the offset to which the harrow is drawn with respect to the path of travel of the tractor. The rear end of the supplemental draft member 16 is pivoted for horizontal movement as shown at 22 to a draft hinge 23 which in turn is pivoted for vertical movement as shown at 24 to a draft bracket 25, which in turn is secured to the right side of one of the side frame members of the front gang frame 15. The front gang frame 15 comprises a front transverse frame member 26 which has its outer ends as shown at 27 bent at right angles with respect to the main portion thereof and secured to the side frame portions 28 of a rear transverse frame member 29. This rear transverse frame member 29 is substantially U shaped in form and has its end portions formed at right angles with respect to the main body portion thereof so as to form the side frame portions of the front gang frame. To further brace the front frame structure, we have provided a second rear transverse frame member 30 which has its outer ends as shown at 31 bent at right angles with respect to the main body portion thereof, for securing the side frame member to the inside of the side frame portions 28 of the transverse rear frame member 29. Journalled in suitable bearings 32 secured to the side frame portions 28 of the front gang frame 15 is the usual disk gang 33.

The rear gang frame generally indicated by the reference character 34 likewise comprises a front transverse frame member 35 having its opposite ends bent at right angles as shown at 36 with respect to the main body portion thereof and secured to side frame portions 37 of a rear transverse frame member 38. The rear transverse frame member 38 is substantially U shaped in form and has the side frame portions 37 thereof bent at right angles with respect to the main body portion thereof. To further strengthen and reinforce the rear gang frame we have provided an intermediate transverse frame member 39 which has its opposite ends as shown at 40 bent at right angles with respect to the main body portion thereof and secured to the inner sides of the side frame portion 37 of the rear transverse frame member 38. Journalled in bearings 41 secured to the side frame portions 37 in a manner well understood in the art, is the usual disk gang 41a.

One of the essential features of the present invention involves a novel means for connecting the rear gang with the front gang so that the rear gang may swing either to the right or left of the longitudinal center of the front gang, or may be locked in intermediate positions of various working angles with respect to the front gang, or the rear gang may be held in parallel arrangement with the front gang so that the gangs may be backed in parallel relation into an otherwise inaccessible part of a field, such as a corner or under a tree, then, by releasing the latch and with a slightly further backward travel of the tractor to angle the gangs and to permit the same to immediately assume a cutting effect for complete cultivation of the field. This novel means of connection between the front and rear gangs also permits the gangs to be transported in parallel relation by reason of the balanced connection between the two gangs. It is further pointed out that this novel connection between the front and rear gangs permits the rear gang to swing to the right of a longitudinal center of the front gang so that the rear gang will properly trail the front gang in a right hand turn of the tractor.

This connecting mechanism between the two gangs comprises a pair of pivoted links generally indicated by the reference characters 42 and 43. The link 42 consists of two flat bars, upper bar 44 and lower bar 45. The forward portions of both bars 44 and 45 are curved or bowed forwardly in a horizontal plane as shown at 46—Fig. 1, and have these portions of the bars lying contiguously and secured together by means of bolts or rivets. The rearward portion of the bar 44 is offset as shown at 47 so that this portion of the upper bar 44 engages the upper edge of the transverse forward frame member 35 of the gang frame 34, while the upper surface of the lower bar 45 engages the lower edge of the transverse forward frame member 35 of the gang frame 34. The rearward end of this link 42 is pivoted to a pin or bolt 48 which extends through the rearward ends of both of the bars 44 and 45 and between a bracket 49 secured in the right forward corner of the transverse forward frame member 35, as clearly shown in Fig. 1. The disks on the right hand end of the rear gang have a tendency to rise out of the ground while the disks on the left hand end of the rear gang have a tendency to penetrate the ground too deeply. To overcome this tendency a transverse guide bar 50 is provided, which has the main body portion thereof extending parallel to the transverse frame member 35, and has its right hand end bent angularly outwardly as shown at 51 terminating in a right angularly extending rear portion as shown at 52, which in turn forms the connecting means for securing this guide member to the right hand side frame portion 37 of the rear gang. The left hand end of the guide member 50 is looped angularly rearwardly and outwardly as shown at 53, and has its rearmost part terminating in a longitudinally extending portion as shown at 54 where it is secured to the outside of the right hand side frame member 37 of the rear gang 34. This guide member extends between the lower side of the rear offset portion 47 of the bar 44 and the upper side of the lower bar 45. The forward end of the link 42 is pivoted to a universal joint generally indicated by the reference character 55, which comprises a hinge bracket 56 pivoted on a vertical pivot as shown at 57 to a longitudinally extending U shaped bracket 58, which has its forward and rearward ends secured between the two transverse rearward frame members 29 and 30 of the front gang frame 15. The forward end of the link 42 is pivoted on a horizontal pivot 59 to the hinge bracket 58. It will be noted that the vertical pivot 57 is located just a slight distance to the left of the longitudinal center of the front gang. The disks on the right hand end of the front gang frame have a tendency to penetrate the ground too deeply, while the disks on the left hand end of the front gang have a tendency to rise out of the ground while the gang is working at its normal working angle. In order to overcome this tendency the link 42 engages the lower edge of the rear transverse frame member 29 of the front gang, as clearly shown in Figs. 1, 4 and 6, so as to overcome the tendency of the right hand end of the front gang to penetrate too deeply, and at the same time to hold the right hand end of the rear gang down, on account of its tendency to rise out of the ground, when the gangs are in their normal working angle.

To further assist the opposite tendencies of these gangs in their normal operation, we have provided a rearward guide member 60 which has its right hand end as shown at 61 pivotally secured to the rear side of the rearward transverse member 29 of the front gang 15. The guide member is vertically offset downwardly as shown at 62 and extends substantially in a horizontal angularly disposed line as shown at 63 to the left hand rear corner of the front gang 15. The left hand end of the guide member is bent vertically upwardly at right angles as shown at 64 to the main body portion thereof. This portion 64 is provided with a plurality of apertures 65 so that the guide member 60 may be vertically adjusted and secured to the transverse frame member by means of a bolt 66. This adjustment of the guide member 60 permits control of the depth penetration of the opposite ends of the front and rear gangs. It will be noted of course, that the right hand portion of the guide member 60 rides over the top surface of the forward portion of the link 42, as the gangs are angled to their working angle.

The other link 43 comprises two normally flat bar members, upper bar member 67 and lower bar member 68, which are secured together. The forward ends of the link 43 are pivoted on a horizontal pivot 69 to a U shaped hinge bracket 70, which in turn is pivoted on a vertical pivot 71 on the rearward side of the transverse frame member 29. The bars 67 and 68 constituting the link 43 are offset downwardly as shown at 72 and are adapted to ride on the upper edge of the offset horizontal portion 63 of the guide member 60. The rearward end of the link 43 is likewise pivoted to a universal connection with the rear gang frame, which comprises a U shaped hinge bracket 73, which in turn is pivoted on a horizontal pin 74 to the looped out portion 53 of the guide member 50 of the rear gang frame 34. Pivoted to the U shaped bracket 73 on a horizontal pin 75 is a second hinge bracket 76 which in turn extends between the offset portion 77 of the lower bar 68 and upper bar 67 of the link 43, and is pivotally secured therein by a bolt or pin 78.

In order to limit the movement of the rear gang in its swing to the right with respect to the front gang in a right hand turn, we have provided a stop 75' which is secured to the right outer side of the side frame member 28 of the front gang frame 15. This stop extends downwardly and is adapted to engage the forwardly bowed portion 46 of the link 42 in limiting the right hand swing of the rear gang with respect to the front gang in a right hand turn of the tractor. This link 42 is shown engaging the stop 75' in Fig. 2 of the drawings.

From the above description it will be noted that the upper side of the link 43 slides under and engages the lower edge of the guide member 50 of the rear gang frame 34 in the angular movement of the rear gang frame with respect to the front gang frame, while the forward portion of the link 43 rides on the upper edge of the horizontal portion 63 of the guide member 60 for holding the left hand end of the rear gang from penetrating the ground too deeply, and holding down the left hand end of the front gang in proper penetration of the ground. It will be noted that the forward pivot of the link 43 is positioned considerably more to the right of the longitudinal center of the front gang than the forward pivot 57 of the link 42, so that on a turn to the right by the tractor, the rear gang will immediately assume a trailing relation to the right of the front gang in order that the draft or strain on the disks of both gangs, as well as that on the tractor is considerably relieved. It will also be noted that by reason of the position of the pivotal connections of these links that on a rearward movement of the tractor, after the latch (hereinafter described) has been released, the rear gang will assume a working angle, or in other words, the left hand ends of both gangs will converge while the right hand ends of the gangs will diverge until a proper working angle is assumed, at which time the latch will lock the gangs for cultivating the field.

Another essential feature of the present improved tandem offset disk harrow includes the mechanism for locking the front and rear gangs in different angular relations, to permit the disk gangs to be held in parallelism during backing, and also permitting the rear gang to assume a trailing relation with respect to the front gang on a right hand turn of the tractor, without any undue draft or strain on the tractor or disks of either gang. This locking mechanism comprises a forwardly extending locking bar 79, which has its rear end twisted as shown at 80, so that the flat surfaces thereof assume a vertical plane. This rear end is pivoted on a horizontal pivot 81 to a hinge bracket 82, which in turn is pivoted on a vertical pin or pivot 83 to an angle bracket 84 secured to the outside of the side frame member 37 of the rear gang frame 34. The locking bar is telescopically mounted in a sleeve 85. Downwardly projecting from the sleeve 85 are two ears 86, only one of which is shown in Fig. 5. These ears are pivotally connected by means of a horizontal pin 87 to a pivot bracket 88, which extends between the ears 86. The bracket 88 in turn is pivoted on a vertical pivot or rivet 89 to an inverted U shaped bracket member 90 which has its opposite ends secured by means of rivets 91 to the rearward transverse frame members 29 and 30. The sleeve is provided with two upwardly extending side portions 92, to the upper end of which is pivoted at 93 a lever 94 which has a downwardly extending arm as shown at 95. Pivoted between the side portion 92 of the sleeve 85 as shown at 96 is a pawl 97 which is adapted to engage a series of teeth 98 formed on a rack 99, which is secured by means of rivets 100 to the upper surface of the bar 79. The pawl 97 is provided with an upwardly and forwardly extending arm 101 to which is pivotally connected at 102 a link 103. The rearward end of the link is pivotally connected at 104 to the lower arm 95 of the lever 94. Extending rearwardly from the pawl 97 is a cam or arm 105, which is adapted to engage an arm 106 of a gravity actuated pawl 107 pivoted at 108 between the lower side portion 92 of the sleeve 85. The pawl 97 is normally actuated into engagement with the teeth 98 of the rack 99 by a spring 109 which has its rearward end connected as shown at 110 to the upwardly extending arm 101 of the pawl, and its forward end as shown at 111 connected to an ear 112 formed on the forward end of the sleeve. The pawl 107 and particularly the rearward end thereof is adapted to engage the forward end as shown at 113 when the operator desires to back the gangs in parallel relation into an otherwise inaccessible place in the field, such as a corner— (see Fig. 4). The upper end of the lever 94 may be connected by a rope or cord to the operator seated on the tractor, so that the manipulation of the locking mechanism may be controlled from the operator's seat on the tractor.

The operation of the improved tandem offset disk harrow herein described is as follows:—

Let us assume that the disk gangs are in parallel position or the position shown in Fig. 1, and that the operator is desirous of throwing the gangs into working angle or the position shown in Fig. 3. The lever 94 is pulled forwardly swinging the lower arm 95 thereof rearwardly and through the link 103 and the arm 101 of the pawl 97, the pawl is swung in a clockwise direction thereby depressing the cam or arm 105 downwardly and elevating the pawl 107 and unlocking it from the end 113 of the rack 99. In other words, the lever 94 is pulled forward from the position shown in Fig. 4 to that shown in Fig. 5, after which the tractor may then be backed until the disks of the gangs assume a working angle or that shown in Fig. 3, at which time the lever is released and the pawl 97 will then engage one of the teeth 98 of the rack 99 and lock the gangs in their working angle. During this rearward movement it will, of course, be understood that the bar 79 slides forwardly through the sleeve and that the left hand ends of the gangs converge while the right hand ends of the gangs diverge. These gangs are caused to assume this working angle on the backward movement of the tractor because it will be noted that the forward pivot of the link 43 is at a relatively greater distance to the right of the longitudinal center of the front gang than the forward pivot of the link 42 is to the left hand side of the longitudinal center of the front gang, thereby causing greater resistance to the left hand end of the rear gang, caused by the disk engaging the ground, and less resistance to the left hand end of the front gang.

Figure 2:
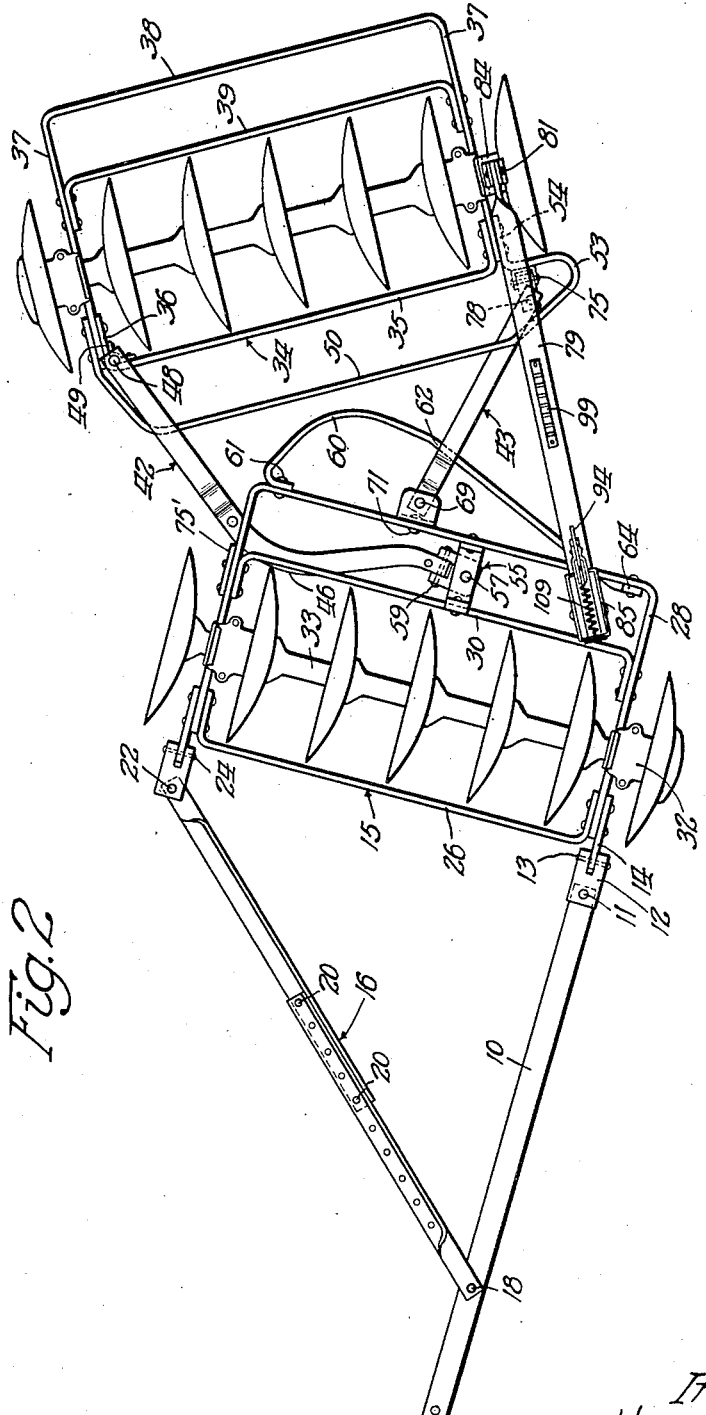

If the operator is desirous of straightening the gangs, or, in other words, have them assume a parallel relation from the position shown in Fig. 2 to that shown in Fig. 1, the lever 94 is drawn forwardly and through the mechanism previously described, the pawl 97 is released from the teeth 98 of the rack 99, and on the forward movement of the tractor the gangs will immediately assume a parallel or transporting position as shown in Fig. 1. If the operator is desirous of backing the harrow into an otherwise inaccessible corner in the field, the gangs may be backed in parallel relation by permitting the pawl 107 to engage the forward end 113 of the rack 99 as shown in Fig. 4, at which time the tractor and harrow may be backed in parallel relation to the otherwise inaccessible place in the field. Then, by releasing the pawl 107 from the forward stop 113 of the rack 99, on a slightly further backward movement of the tractor, the gangs will immediately assume a working angle in the manner previously described, so that complete cultivation of the field may be assured.

If the operator is desirous of making a right hand turn with the tractor from a position in which the harrow is in a working angle, it will be necessary to pull the lever 94 forward so that the pawl 97 will be raised above the teeth 98 of the rack 99 to permit the bar 79 to slide freely rearwardly in the sleeve 85, at which time the rear gang will immediately trail to the right of the front gang as the right hand turn is being made by the tractor, and in order to limit the angular movement of the rear gang to the right of the front gang, the link 42 will engage the stop 75' on the front gang frame 15 in the manner shown in Fig. 2, so that the rear gang will properly trail the front gang in a right hand turn, without any excessive draft or strain on the disks of the gangs.

When the gangs are in parallel, the pawl 107 engages the forward portion 113 of the rack 99 as above described to hold the gangs in this parallel relation when a tractor and harrow is being backed. In other words this arrangement prevents a forward movement of the bar 79 in the sleeve 85. In this position, however, there is no locked relation between either pawl and rack to prevent the bar 79 from sliding rearwardly in the sleeve 85, which it does when the harrow and tractor makes a right hand turn. When the pawl 107 is disengaged from the shoulder 113 of the rack 99, and the gangs are moved from a parallel position to a working angle, the bar 79 slides freely forward in the sleeve 85 and the pawl 97 will automatically ratchet over the teeth 98 of the rack 99 unless it is held out of engagement by a continued forward pull on the lever.

While in the above specification, we have described one embodiment which this invention may assume in practice, it will, of course, be understood that the same is capable of modification, and that modification may be made without departing from the spirit and scope of the invention as expressed in the following claims.

What we claim as our invention and desire to secure by Letters Patent is:

1. A tandem offset disk harrow comprising front and rear disk gangs, means for pivotally connecting said gangs together whereby one of said gangs may move bodily to the right or left to assume an angular position with respect to the other of said gangs, guides secured to the adjacent portions of said gangs and engageable with said connecting means for maintaining even penetration of the ground by all of the disks of both of said gangs, and means for adjusting said last named means whereby the depth penetration of the disks on the opposite ends of both gangs may be controlled.

2. A tandem offset disk harrow comprising front and rear frames, disk gangs mounted in each of said frames, links pivotally connecting said frames together, the pivotal connections of the forward ends of said links with the front frame being located at different distances from the longitudinal center of the front gang, the pivotal connection of the rearward ends of said links being located on the opposite sides of the longitudinal center of the rear gang, a guide member associated with said front gang and engageable with said links for varying the depth penetration of the disks on the opposite ends of said gangs and means for vertically adjusting one of said guide members for varying the depth penetration of certain of said disks.

3. A tandem offset disk harrow comprising front and rear gangs, links pivotally connecting said gangs together so that the rear gang may be angled to the left of the front gang for both gangs to assume a working angle, and to permit the rear gang to swing to the right of the front gang in trailing relation on a right hand turn, a locking connection between the two gangs comprising a locking bar pivotally related to the rear gang and extending forwardly toward the front gang, a locking mechanism associated with the front gang and operatively connected to said locking bar, said locking mechanism comprising a pawl for engaging said locking bar in locking the gangs in said angular relations, a lever mounted on said locking mechanism for controlling said pawl, and a second pawl engageable with said locking bar and controlled by said lever whereby said last named pawl may engage said locking bar for moving the gangs rearwardly in parallel relation.

4. A tandem offset disk harrow comprising front and rear frames, disk gangs mounted in each of said frames, links pivotally connecting said frames together whereby said rear gang may swing to the right of said front gang for properly trailing the same on a right hand turn of the harrow, and means on said front gang and engageable with said links for limiting the angular trailing movement of said rear gang frame with respect to said front gang frame, on a right hand turn of the tractor.

5. A tandem offset disk harrow comprising a front frame and a rear frame, disk gangs mounted in each of said frames, means including a plurality of links pivoted at their forward and rearward ends to the front and rear frames respectively, said links having straight line passing through the respective pivots of each of these links intersecting, the forward pivots of said links being located at different distances from the longitudinal center of the front gang and the pivots of the rear ends of said links being located on the opposite sides of the longitudinal center of the rear gang, and means engageable with said links for adjusting the depth penetration of the disks on the opposite ends of the respective front and rear gangs.

6. A tandem offset disk harrow comprising a front frame and a rear frame, disk gangs mounted in each of said frames, means including a plurality of links pivoted at their forward and rearward ends to the front and rear frames respectively, said links having straight lines passing through the respective pivots of each of these links intersecting, the forward pivots of said links being located at different distances from the longitudinal center of the front gang and the pivots of the rear ends of said links being located on the opposite sides of the longitudinal center of the rear gang, guide means secured to each of said gang frames and engaging said links for controlling the depth penetration of the disks on the opposite ends of the respective front and rear gangs, and means for adjusting one of said guide means whereby the depth penetration of the disks on the opposite ends of said respective front and rear gangs may be varied.

WILLIAM F. SMITH.
UNA H. NEECE.